Sept. 1, 1931.  W. G. WILSON  1,821,865

FLUID TIGHT JOINT AND METHOD OF MAKING

Filed Nov. 1, 1929

Inventor
Wylie G. Wilson
By his Attorney

Patented Sept. 1, 1931

1,821,865

UNITED STATES PATENT OFFICE

WYLIE G. WILSON, OF ELIZABETH, NEW JERSEY

FLUID TIGHT JOINT AND METHOD OF MAKING

Application filed November 1, 1929. Serial No. 403,978.

This invention relates to a fluid tight joint and to the method of making the same. The joint is particularly useful in connecting together sections of metal pipe or conduits used to transmit fluids under pressure and hence it will be disclosed in that connection. It will be obvious, however, that the invention may be used in other connections.

Heretofore in the art, pipes have usually been joined by simple threaded sleeves, or by constructions involving more or less plastic gaskets, or accurately ground abutting surfaces. Simple threaded sleeves are not customarily used for large sizes of pipe because of the difficulty of making a leak-tight joint and the difficulty of rotating the pipe in making the joint; also joints made with simple threaded sleeves have a rough interior. Gaskets of more or less plastic material are apt to be blown out by high pressure; they deteriorate with age and heat; and in many cases great force must be used in clamping together the parts with which the gasket is associated. Accurately ground abutting surfaces are expensive to manufacture and are not suitable in many cases. Other types of joints have been proposed, but the types above referred to are the ones that are most extensively used.

The general object of the present invention is to provide a joint structure and/or method of making a joint which will withstand high pressure and can be manufactured at low cost by ordinary commercial methods.

Another object of the invention is to provide a joint structure and/or method of making a joint which will withstand high fluid pressure without requiring greater manufacturing precision or greater care in assembling than is involved in ordinary commercial work.

Another object of the invention is to provide a joint structure and/or method of making a joint in pipes or the like, which maintains the interior of the pipe smooth and of a size at the joint equal to the normal size of the pipe and free from cracks or crevices.

Other objects of the invention will be obvious from the following disclosure.

In accordance with the above and other objects of the invention, various difficulties of the prior art are overcome by a construction in which two pieces of pipe or the like are sealed together by a continuous one-piece sealing ring having oppositely inclined annular sealing surfaces, one of which cooperates with each of the pipe ends. The pipe ends are provided with annular corners which are adapted to exert pressure on the sealing surfaces of the ring and to slide over such sealing surfaces as the ends of the pipe are drawn together. In this way, the annular corners on the ends of the pipe are lapped into sealing fit with the sealing surfaces of the ring and the ring is circumferentially contracted as a whole, thereby setting up a heavy permanent sealing pressure between the annular corners on the pipe and the sealing surfaces of the ring.

Figure 1:
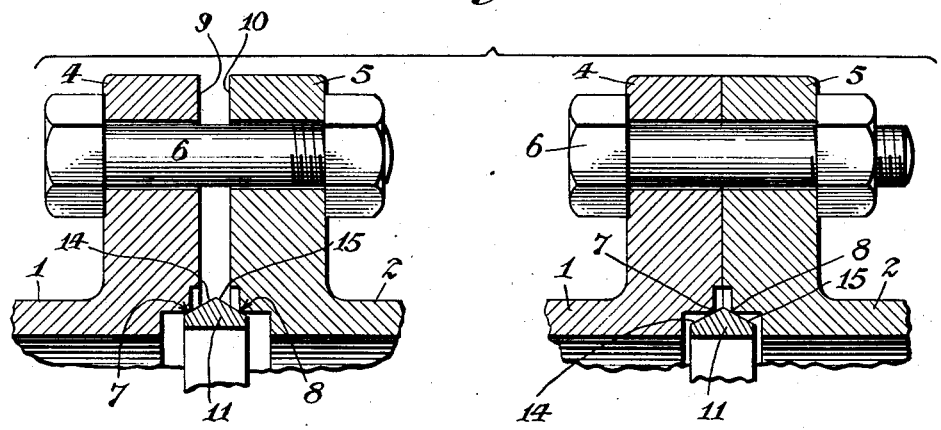
Fig. 1 is a fragmentary cross sectional view taken longitudinally of the pipe, the left-hand portion of the figure showing the parts assembled preparatory to making the joint and the right-hand portion of the figure showing the completed joint.

Reference will now be had to Fig. 1. Sections of pipe 1 and 2 that are to be joined are provided with ends or fittings having annular flanges 4 and 5 adapted to be drawn together by bolts 6, as is well understood in the art. The end of each pipe is recessed as shown in the drawing in a manner which is equivalent to two concentric counterbores, one smaller than the other and deeper than the other. This forms annular corners 7 and 8 which are more or less square, the corners being spaced a short distance from the end surfaces 9 and 10 on the flanges. The pipe ends are assembled with the recesses in alignment and a sealing ring 11 positioned in the recesses as shown in Fig. 1. The ring 11 is a continuous solid ring of metal, preferably similar to the metal of the pipe, and having inclined annular sealing surfaces 14 and 15, one of which contacts with each of the shoulders 7 and 8. As shown in the left-hand portion of Fig. 1, the normal internal diameter of the sealing ring 11 is preferably somewhat larger than the internal diameter of the pipe. The metal of the ring is preferably resilient and preferably is malleable or worked metal or ductile metal. The ring is so proportioned that upon being constricted with sufficient force, it contracts circumferentially as a unit.

After the parts have been assembled as shown in the left-hand portion of Fig. 1, the flanges 4 and 5 are drawn together by bolts 6. This causes the corners 7 and 8 to exert pressure on the faces 14 and 15, which pressure increases in value (due to the increasing resistance of the ring) as the flanges are drawn together. Accordingly, the corners 7 and 8 slide over the surfaces 14 and 15 while exerting considerable pressure on those surfaces. This sliding of surfaces under pressure causes local action on the metal of the sliding surfaces which is in effect a local cold working that somewhat densifies the surface metal; it also so removes machining irregularities as to produce sealing fit capable of withstanding high pressure. For convenience, this local action by which the sealing fit is produced will be referred to as lapping action. The circumferential pressure on the ring also so constricts the ring that the entire ring is contracted as a unit and thus permanent sealing pressure is established on the walls 9 and 10, due to the resiliency of the metal of the sealing ring. When I say the ring is contracted as a unit, I mean that the ring is contracted throughout its entire length. In fact, in actual practice with a ring having the proportions shown in the drawings the geometrical configuration of the ring's cross section (taken as in the drawings) is maintained, but the entire circumference of the ring is reduced. With such a ring the geometrical change of the ring in actual practice is similar in kind (not necessarily degree) to the geometrical change caused by a decrease in temperature of the ring.

In the finished joint of Fig. 1, the flanges 4 and 5 are in contact as shown in the right-hand portion of the figure, and the sealing ring 11 has preferably been so contracted that its interior surface is flush with the interior surface of the pipe. The ring is held in this condition by the constricting pressure applied by the corners 7 and 8 near the apex of the ring's cross section. Conversely, the resiliency of the ring causes it to be urged outwardly against the corners and since the area of contact between the surfaces 14 and 15 and the ends of the pipe is quite small, the sealing pressure per unit area is very large. The flanges 4 and 5 form a rigid mechanical connection between the two sections of the pipe so that any bending stresses which may be put upon the pipe are resisted at the joint by the bolted flanges and hence such stresses cannot impair the seal. Also, the flanges so reenforce the ends of the pipe that their size remains fixed as the ring is constricted.

Figure 2:
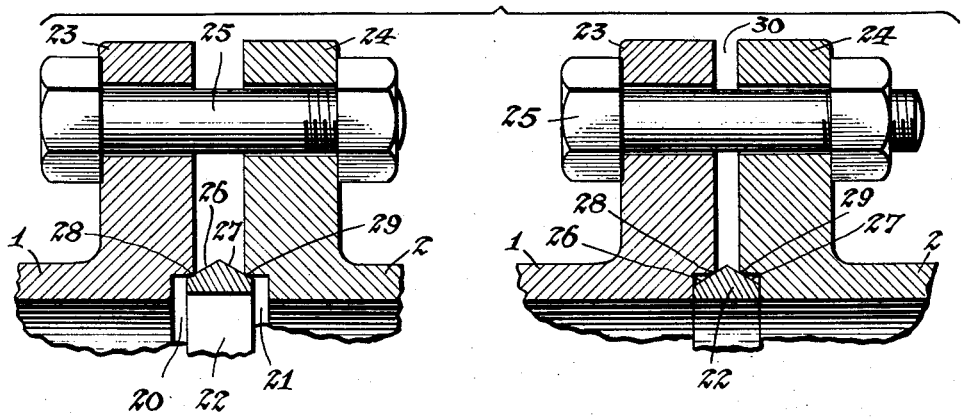
Fig. 2 is a view similar to Fig. 1 showing a modified form of the invention.

The construction shown in Fig. 2 is similar to that shown in Fig. 1 except that each pipe end is recessed in a manner which is equivalent to a single counter-bore, thus leaving each pipe end with an annular corner which is more or less square and is located at the very end of the pipe. Also, the depth of the recesses 20 and 21 in the pipe ends is so related to the length of the sealing ring 22 that the bottoms of the recesses will engage the ends of the sealing ring before the surfaces of the flanges 23 and 24 are brought together. The parts are initially assembled as shown in the left portion of Fig. 2. Then as the ends of the pipe are drawn together by any suitable means such as bolts 25, the tapered sealing surfaces 26 and 27 of the sealing ring are lapped into sealing contact with the annular corners 28 and 29 on the pipe ends, and the sealing ring is circumferentially contracted as in Fig. 1. Due to the smaller depth of the recesses in the pipe ends, the bottoms of the recesses 20 and 21 are drawn into contact with the ends of the sealing ring 22, leaving a small space 27 between the ends of the pipe. In the completed joint the ring 22 is preferably so contracted that its internal diameter is flush with the interior of the pipe, so that there is no change in the size of the conduit (and no crevices) at the joint. The construction of Fig. 2 allows for manufacturing variations in that it permits the bottoms of the recesses 20 and 21 to be always drawn against the ends of the sealing ring 22 regardless of manufacturing variations in dimensions. A certain degree of seal is produced by this contact between the bottoms of the recesses 20 and 21 and the ends of ring 22.

The wedging action which is exerted on the sealing ring as the joint is drawn up is one which has great mechanical advantage, and hence large sealing pressures may be exerted with relatively small forces applied by the bolts 6, or other means used to draw the pipe ends together. The amount of the mechanical advantage obtained depends, of course, upon the angle of the sloping surfaces. If a small angle be used, (i. e. measured from the axis of the pipe) a large mechanical advantage is obtained, but the sealing ring must have a relatively long length and the ends of the pipe must be moved a relatively large distance in order to obtain a given contraction of the ring. On the other hand, if the angle of the sloping surfaces be large, the conditions are just the reverse. An angle should be used which best suits the particular purpose, but I have found that for many purposes an angle of 16 degrees is satisfactory as it is very desirable that the sealing ring be relatively short measured axially.

The desirability of a short sealing ring will be obvious from the following considerations. As a practical proposition there is a maximum permissible pull which can be exerted by the bolts which draw the flanges together. This maximum permissible pull can contract a sealing ring of not over certain cross-sectional area. Accordingly, the shorter the sealing ring is made, the thicker it may be made; and the thicker the ring, the higher pipe line pressure it will withstand. Also, the shorter the ring, the more perfectly its ends will remain parallel to each other during contraction of the ring, and hence the more perfectly the flanges will grip the ends of the ring. The length of the ring is such as to take care of manufacturing variations in the size of the ring and in the size of the pipe, i. e., to insure that the end of the pipe will start over the ring and that it will encounter a sufficient length of tapered surface on the ring to give adequate contraction of the ring and adequate lapping action between the ring and the pipe end.

As the parts are assembled preparatory to drawing up the joint, the sealing ring is floating and acts to automatically align the pipe ends with each other and with the sealing ring. The contacting surfaces are so effectively lapped into a sealing fit that ordinary commercial machining methods are sufficiently accurate in making the parts, and the joint does not require great care in manufacture or in assembling. In fact, in actual practice a fluid tight seal is obtained by the time a fraction of the lapping movement has been completed.

The exact dimensions and material of the sealing ring are not important so long as they are such as to permit the ring to act as above described. In general, the material of the ring must have compressive strength and elasticity and is preferably a ductile or malleable or worked metal similar to, or somewhat softer than, the pipes to be joined. Thus, a steel ring is preferably used for steel pipe and a brass ring for brass pipe. The material of the ring and its cross sectional proportions (i. e. axial length to cross axial thickness) are such that the ring contracts as a unit when constricted, as has previously been pointed out, but the exact proportions and dimensions may be varied considerably. The ring may have a thickness slightly less than the thickness of the pipe and a length slightly greater than twice its thickness. As shown in the drawings, the ends of the pipe are preferably reenforced as by the flanges 4 and 5 or 23 and 24, so that the pipe ends remain a fixed size as the joint is drawn together and the sealing ring contracted. When fluid under pressure is placed in the pipe, it tends to expand the sealing ring outwardly, thus adding to the sealing pressure between the sloping sealing surfaces of the ring and the annular corners on the pipe.

The invention may assume forms other than those specifically disclosed and may be used in connections other than those specifically disclosed. Accordingly, the present disclosure is to be considered as illustrative in compliance with the patent statutes and is not to be considered as limiting.

Having described my invention, what I claim is:

1. A fluid tight joint structure comprising two elements to be joined, each element being formed to provide an outwardly projecting annular corner, a sealing ring of resilient material resistant to distortion, as a unit, and having inclined annular surfaces engaging said corners, and means to move the elements toward one another to lap said corners into sealing fit with the ring and to circumferentially contract the ring as a unit to establish permanent sealing pressure on said corners, the ring being of suitable length and thickness and having appropriate inclined surfaces so that the prescribed contraction and lapped sealed joint is effected in the assembly.

2. A fluid tight joint structure comprising two elements to be joined, each element being formed to provide an outwardly projecting annular corner and the two recesses being in alignment, a resilient worked metal sealing ring resistant to deformation as a unit and having appropriate inclined annular surfaces engaging said corners, and means to move the elements relative to the sealing ring to form a lapped sealing fit with said inclined surfaces and to circumferentially contact the ring as a unit to establish permanent sealing pressure over the lapped areas, said elements having surfaces which abut and determine the final position of the parts independently of the engagement of said elements with the sealing ring, the ring being of suitable length and thickness and having appropriate inclined surfaces so that the prescribed contraction and lapped seal joint is effected in the assembly.

3. A fluid tight joint structure comprising two elements to be joined, each element being recessed to provide an outwardly projecting annular corner, a sealing ring of resilient material resistant to distortion as a unit, and having inclined annular surfaces engaging said corners, and means to move the elements toward one another to lap said corners into sealing fit with the ring and to circumferentially contract the ring as a unit to establish permanent sealing pressure on said corners, the ring being of suitable length and thickness and having appropriate inclined surfaces so that the prescribed contraction and lapped seal joint is effected in the assembly.

4. A fluid tight joint structure comprising two elements to be joined, each element being recessed to provide an outwardly projecting annular corner and the two recesses being in alignment, a resilient worked metal sealing ring resistant to deformation as a unit, and having appropriate inclined annular surfaces engaging said corners, and means to move the elements relative to the sealing ring to form a lapped sealing fit with said inclined surfaces and to circumferentially contract the ring as a unit to establish permanent sealing pressure over the lapped areas, said elements having surfaces which abut and determine the final position of the parts independently of the engagement of said elements with the sealing ring, the ring being of suitable length and thickness and having appropriate inclined surfaces so that the prescribed contraction and lapped seal joint is effected in the assembly.

In testimony whereof I affix my signature.

WYLIE G. WILSON.